(12) United States Patent
Liu et al.

(10) Patent No.: US 11,544,856 B1
(45) Date of Patent: Jan. 3, 2023

(54) METHOD FOR MEASURING MOTION RESPONSE OF DUMMY IN CRASH TEST, DEVICE AND STORAGE MEDIUM

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Zhixin Liu, Tianjin (CN); Zhixin Wu, Tianjin (CN); Hong Chen, Tianjin (CN); Weidong Liu, Tianjin (CN); Weijie Ma, Tianjin (CN); Kai Wang, Tianjin (CN); Minghao Xie, Tianjin (CN)

(73) Assignees: CHINA AUTOMOTIVE TECHNOLOGY AND RESEARCH CENTER CO. LTD, Tianjin (CN); CATARC AUTOMOTIVE TEST CENTER (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 17/818,391

(22) Filed: Aug. 9, 2022

(30) Foreign Application Priority Data

Apr. 18, 2022 (CN) .......................... 202210400875.5

(51) Int. Cl.
 *G06T 7/246* (2017.01)
(52) U.S. Cl.
 CPC .............. *G06T 7/251* (2017.01); *G06T 7/248* (2017.01); *G06T 2207/10016* (2013.01); *G06T 2207/30204* (2013.01); *G06T 2207/30241* (2013.01)

(58) Field of Classification Search
 CPC .......... G06T 7/248; G06T 7/251; G06T 7/70; G06T 2207/10016; G06T 2207/30204;
 (Continued)

(56) References Cited

U.S. PATENT DOCUMENTS

| 7,832,762 B2 | 11/2010 | Breed |
| 8,086,430 B2 | 12/2011 | Thomas |

(Continued)

FOREIGN PATENT DOCUMENTS

| CA | 3029939 A1 | 7/2020 |
| CN | 206074217 U | 4/2017 |

(Continued)

*Primary Examiner* — Katrina R Fujita
(74) *Attorney, Agent, or Firm* — True Shepherd LLC; Andrew C. Cheng

(57) ABSTRACT

A method for measuring the motion response of a dummy in a crash test comprises: acquiring images of a measurement mark by a camera during the crash test, wherein the measurement mark is fixed on a part to be measured of the dummy, and the dummy is set in association with a preset platform; determining first coordinate positions of the measurement mark in the images; determining corresponding second coordinate positions of the first coordinate positions in a static coordinate system according to a preset conversion relationship, wherein the X-axis of the static coordinate system is parallel to the motion direction of the preset platform, the Y-axis of the static coordinate system is perpendicular to the motion direction of the preset platform; and determining a motion response trajectory of the part to be measured according to an initial position of the part to be measured and the second coordinate positions.

9 Claims, 10 Drawing Sheets

(58) Field of Classification Search
CPC ..... G06T 2207/30241; G01M 17/0078; G01B 11/002
See application file for complete search history.

(56) References Cited

U.S. PATENT DOCUMENTS

| | | | |
|---|---|---|---|
| 10,769,967 B2 | 9/2020 | Panzer et al. | |
| 2006/0008116 A1* | 1/2006 | Kiraly | G06T 7/20 382/103 |
| 2016/0259993 A1* | 9/2016 | Ulbricht | G06T 7/579 |
| 2017/0193670 A1* | 7/2017 | Lee | G06T 7/246 |
| 2017/0200278 A1* | 7/2017 | Lee | G06T 7/80 |
| 2020/0132450 A1* | 4/2020 | Grzesiak | G01B 11/2545 |
| 2020/0225133 A1 | 7/2020 | Petel et al. | |
| 2020/0405395 A1 | 12/2020 | Gullotti et al. | |
| 2022/0252385 A1* | 8/2022 | Wang | G01B 11/005 |

FOREIGN PATENT DOCUMENTS

| | | | |
|---|---|---|---|
| CN | 109263637 A | 1/2019 | |
| CN | 209802623 U | 12/2019 | |
| CN | 111623942 A | 9/2020 | |
| WO | 9109275 A2 | 6/1991 | |

* cited by examiner

METHOD FOR MEASURING MOTION RESPONSE OF DUMMY IN CRASH TEST, DEVICE AND STORAGE MEDIUM

CROSS-REFERENCE TO RELATED APPLICATIONS

This application claims priority to Chinese Patent Application No. 202210400875.5 with a filing date of Apr. 18, 2022. The content of the aforementioned application, including any intervening amendments thereto, is incorporated herein by reference.

TECHNICAL FIELD

The present invention relates to the field of vehicle passive safety test, in particular to a method for measuring the motion response of a dummy in a crash test, a device and a storage medium.

DESCRIPTION OF RELATED ART

Vehicle crash test is the technical core for evaluating the safety performance of a vehicle, and a crash dummy (dummy for short) is the key test equipment directly used for vehicle safety performance evaluation instead of occupants. The vehicle crash test has the characteristic of instantaneous high load. Due to impact, various parts of the dummy have obvious motion responses relative to initial positions. The motion response trajectories of different parts of the dummy are important evaluation indexes for evaluating its biological simulation, and are also main evaluation basis for vehicle safety performance tests such as pedestrian protection test and airbag protection effectiveness test.

However, there is currently no related technology that can directly and accurately measure the motion response trajectory of any part of the dummy.

In view of that, the present invention is proposed.

SUMMARY

In order to solve the above technical problems, the present invention provides a method for measuring the motion response of a dummy in a crash test, a device and a storage medium, so as to achieve the purpose of accurately measuring the motion response of any part of the dummy during the crash test.

An embodiment of the present invention provides a method for measuring the motion response of a dummy in a crash test, the method including:

acquiring images of a measurement mark at different times by a camera during the crash test, wherein the measurement mark is fixed on a part to be measured of the dummy, and the dummy is set in association with a preset platform;

determining first coordinate positions of the measurement mark in the images at different times, respectively;

determining, according to the first coordinate positions, corresponding second coordinate positions of the measurement mark in a preset coordinate system at different times through a preset conversion relationship, wherein the X-axis of the preset coordinate system is parallel to the motion direction of the preset platform, the Y-axis of the preset coordinate system is perpendicular to the motion direction of the preset platform, a first side of pixel cells of the images is parallel to the X-axis, and a second side of the pixel cells intersecting with the first side is parallel to the Y-axis; and determining the motion response of the part to be measured according to an initial position of the measurement mark in the preset coordinate system and the second coordinate positions.

An embodiment of the present invention provides an electronic device, the electronic device including:

a processor and a memory.

The processor is configured to execute the steps of the method for measuring the motion response of a dummy in a crash test according to any embodiment by calling programs or instructions stored in the memory.

An embodiment of the present invention provides a computer-readable storage medium storing programs or instructions that cause a computer to execute the steps of the method for measuring the motion response of a dummy in a crash test according to any embodiment.

The embodiments of the present invention have the following technical effects.

Images of a measurement mark that is fixed on a part to be measured of the dummy at different times are captured by a camera, and then positions of the measurement mark in a preset coordinate system are determined according to positions of the measurement mark in the images and a preset conversion relationship, that is, the motion response of the part to be measured of the dummy is represented by the motion response of the measurement mark, so as to realize the measurement of the motion response of any part to be measured of the dummy; By adjusting the camera, a first side of pixel cells of the captured images is parallel to the X-axis of the preset coordinate system, and a second side of the pixel cells intersecting with the first side is parallel to the Y-axis of the preset coordinate system, thereby avoiding an angle between the image coordinate system and the preset coordinate system, achieving the purposes of reducing conversion complexity and reducing calculation errors, and then improving measurement accuracy; The X-axis of the preset coordinate system is parallel to the motion direction of the preset platform, and the Y-axis of the preset coordinate system is perpendicular to the motion direction of the preset platform, which can further reduce calculation errors and complexity.

BRIEF DESCRIPTION OF THE DRAWINGS

In order to describe the specific embodiments of the present invention or the technical solutions in the prior art more clearly, the following briefly introduces the accompanying drawings required for describing the specific embodiments or the prior art. Apparently, the accompanying drawings in the following description show only some embodiments of the present invention, and those of ordinary skill in the art may still derive other drawings from these accompanying drawings without creative efforts.

DESCRIPTION OF THE EMBODIMENTS

In order to make the objectives, technical solutions and advantages of the present invention clearer, the technical solutions of the present invention will be described clearly and completely below. Obviously, the described embodiments are only some, but not all embodiments of the present invention. Based on the embodiments of the present invention, all other embodiments obtained by those of ordinary skill in the art without any creative effort shall fall within the protection scope of the present invention.

Due to the short time and rapid speed change of the vehicle crash test, the motion response of each part of a dummy has the effects of difficult capture of transient states and superposition of nonlinear crash loads. Therefore, how to scientifically, simply and accurately obtain motion directions and motion trajectories of a part to be measured of a dummy at different times during crash test is the technical problem mainly solved by the embodiments of the present invention.

The method for measuring the motion response of a dummy in a crash test according to the embodiments of the present invention does not require the help of a sensor, so the motion response of a part to be measured where a sensor is not suitable for installation (the installation of a sensor needs to ensure its working performance and accuracy, so not all parts to be measured can be installed with a sensor) can be accurately measured by the solution of the embodiments of the present invention. The method for measuring the motion response of a dummy in a crash test according to the embodiments of the present invention may be executed by an electronic device including a processor and a memory. The processor executes the steps of the method for measuring the motion response of a dummy in a crash test by calling programs or instructions stored in the memory.

Figure 1:
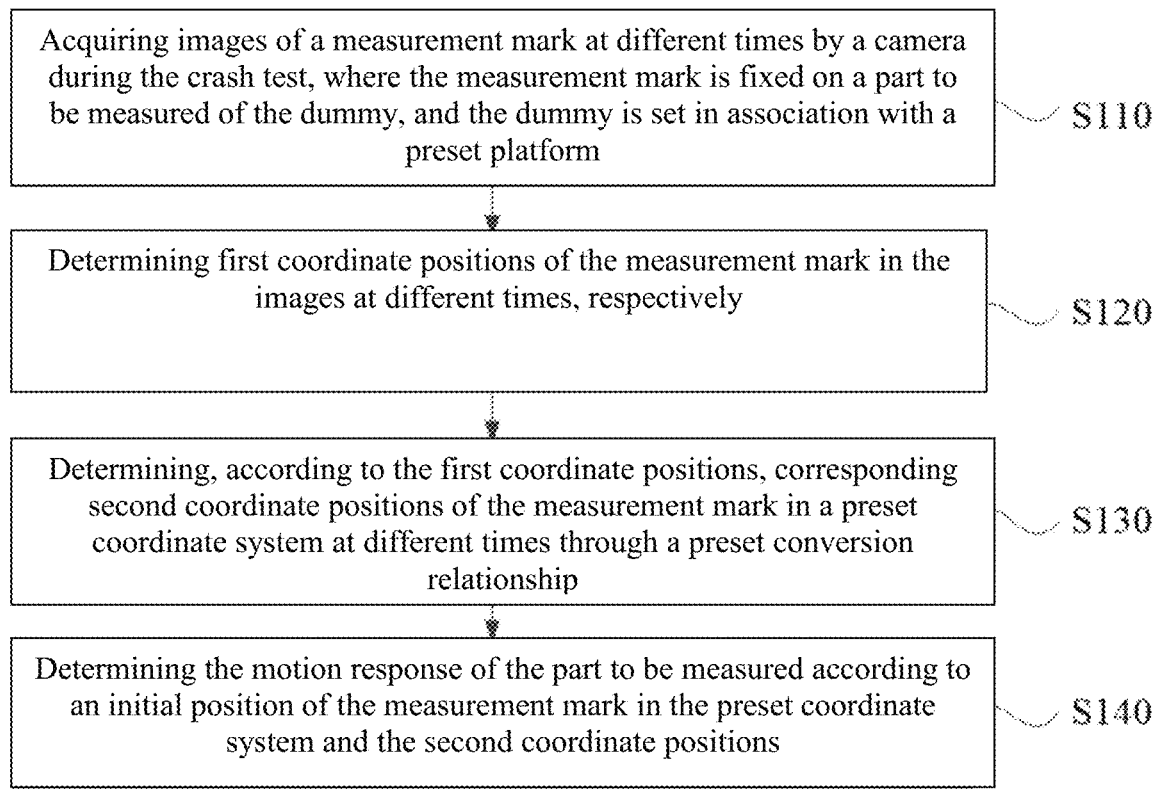
FIG. 1 is a flowchart of a method for measuring the motion response of a dummy in a crash test according to an embodiment of the present invention.

FIG. 1 is a flowchart of a method for measuring the motion response of a dummy in a crash test according to an embodiment of the present invention. With reference to FIG. 1, the method for measuring the motion response of a dummy in a crash test specifically includes the following steps.

S110: Acquiring images of a measurement mark at different times by a camera during the crash test, wherein the measurement mark is fixed on a part to be measured of the dummy, and the dummy is set in association with a preset platform.

Figure 2:
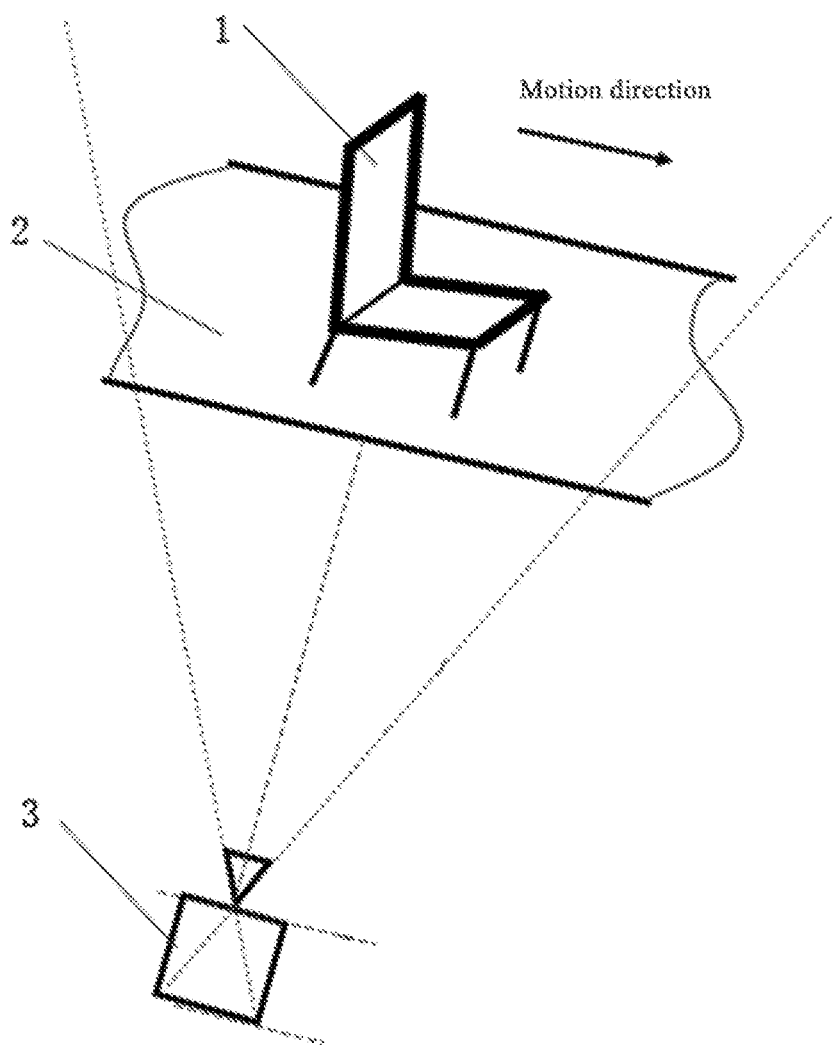
FIG. 2 is a schematic illustration of a test scenario according to an embodiment of the present invention.

The crash test is a test that simulates vehicle crash in a certain form, and can be performed with the help of a specific test scenario. Optionally, refer to a schematic illustration of a test scenario shown in FIG. 2, including a preset platform 2 and a measurement seat 1. The preset platform 2 is a movable platform, such as a track traction platform. Different forms of crash can be simulated by applying accelerations of different waveforms to the preset platform 2. After the acceleration is applied to the preset platform 2, the preset platform 2 moves along a preset track. It can be understood that the preset platform 2 can move only in the horizontal direction, or can move in both the horizontal direction and the vertical direction, and can even move in any direction. The specific direction of movement is determined by the applied acceleration. In the embodiment of the present invention, the preset platform 2 can move only in the horizontal direction as an example for description.

Figure 3:
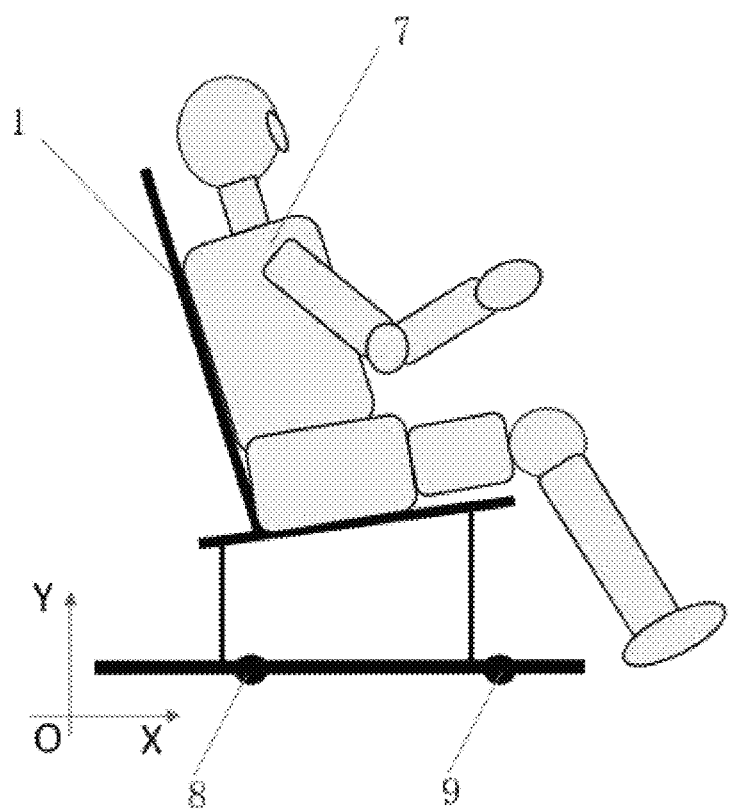
FIG. 3 is a schematic illustration showing that a dummy is sitting on a measurement seat 1 of a preset platform 2 according to an embodiment of the present invention.

During the crash test, a camera 3 captures images of a measurement mark at different times. The measurement mark is fixed on a part to be measured of the dummy, and the dummy is set in association with the preset platform 2. For example, the dummy can stand on the preset platform 2, or the dummy can sit on the measurement seat 1 of the preset platform 2. FIG. 3 is a schematic illustration showing that the dummy is sitting on the measurement seat 1 of the preset platform 2. Generally, the preset platform 2 is a track traction platform, and the preset platform 2 slides along a preset track during the crash test. The measurement seat 1 is arranged on the preset platform 2, the measurement seat 1 is rigidly fixed on the preset platform 2, and the dummy is arranged on the measurement seat 1.

It can be understood that, during the crash test, the dummy needs to be always within the shooting range of the camera 3, and the position of the camera 3 can be adjusted to meet the requirement. During the crash test, the position of the camera 3 may be fixed, or may be movable with the motion of the dummy. In the embodiments of the present invention, the position of the camera 3 is unchangeable during the crash test as an example for description.

It should be noted that there is a corresponding image of the measurement mark at each specific time.

S120: Determining first coordinate positions of the measurement mark in the images at different times, respectively.

Specifically, the first coordinate positions of the measurement mark in the images may be determined from corresponding pixel cells of the measurement mark in the images.

Exemplarily, it is assumed that there is a first image a1 of the measurement mark at time T1, a second image a2 of the measurement mark at time T2, and a third image a3 of the measurement mark at time T3. Then a first coordinate position of the measurement mark in the first image a1, a first coordinate position of the measurement mark in the second image a2, and a first coordinate position of the measurement mark in the third image a3 are determined respectively. Generally, the first coordinate positions of the measurement mark in the images at different times are determined respectively.

S130: Determining, according to the first coordinate positions, corresponding second coordinate positions of the measurement mark in a preset coordinate system at different times through a preset conversion relationship.

The X-axis of the preset coordinate system is parallel to the motion direction of the preset platform, and the Y-axis of the preset coordinate system is perpendicular to the motion direction of the preset platform, that is, the preset coordinate system is matched with the position of the dummy in the real physical environment, to reduce measurement difficulty and improve measurement accuracy.

Further, in order to reduce the calculation complexity and calculation error of obtaining the second coordinate positions of the measurement mark in the preset coordinate system based on the first coordinate positions of the measurement mark in the images, in the embodiment of the present invention, by adjusting the camera, a first side of pixel cells of the images captured by the camera is parallel to the X-axis, and a second side of the pixel cells intersecting with the first side is parallel to the Y-axis, to ensure that the plane of the coordinate system where the pixel cells are located is parallel to the plane of the preset coordinate system, and there is no inclined angle between the two, thereby achieving the purpose of reducing the conversion complexity and conversion error and indirectly improving measurement accuracy. Specifically, the position and/or angle of the camera can be adjusted so that the optical axis of the camera is perpendicular to the plane where the measurement seat is located.

Exemplarily, it is assumed that there is a first image a1 of the measurement mark at time T1, a second image a2 of the measurement mark at time T2, and a third image a3 of the measurement mark at time T3. Then a first coordinate position of the measurement mark in the first image a1, a first coordinate position of the measurement mark in the second image a2, and a first coordinate position of the measurement mark in the third image a3 are determined respectively. Next, a second coordinate position of the measurement mark at the first coordinate position of the first image a1 in the preset coordinate system, a second coordinate position of the measurement mark at the first coordinate position of the second image a2 in the preset coordinate system, and a second coordinate position of the measurement mark at the first coordinate position of the third image a3 in the preset coordinate system are determined. Generally, corresponding second coordinate positions of the measurement mark in a preset coordinate system at different times are determined through a preset conversion relationship according to the first coordinate positions.

S140: Determining the motion response of the part to be measured according to an initial position of the measurement mark in the preset coordinate system and the second coordinate positions.

Specifically, a motion trajectory of the measurement mark is determined according to the initial position of the measurement mark and the second coordinate positions of the measurement mark at different times, and the motion response of the part to be measured can be determined based on the motion trajectory of the measurement mark. For example, the motion trajectory of the measurement mark can be directly determined as the motion response of the part to be measured, or further, a motion trajectory of a center point of the measurement mark is determined according to motion trajectories of some measurement reference points of the measurement mark, and the motion response of the part to be measured is determined based on the motion trajectory of the center point of the measurement mark. It can be understood that the motion response includes not only the motion trajectory, but also the motion direction.

Further, considering that the motion response of the dummy is a complex motion state composed of translation and rotation, the motion response is realized in virtue of the measurement mark in the embodiment of the present invention in order to accurately obtain the instantaneous motion direction and displacement of the part to be measured of the dummy during the crash.

Figure 4:
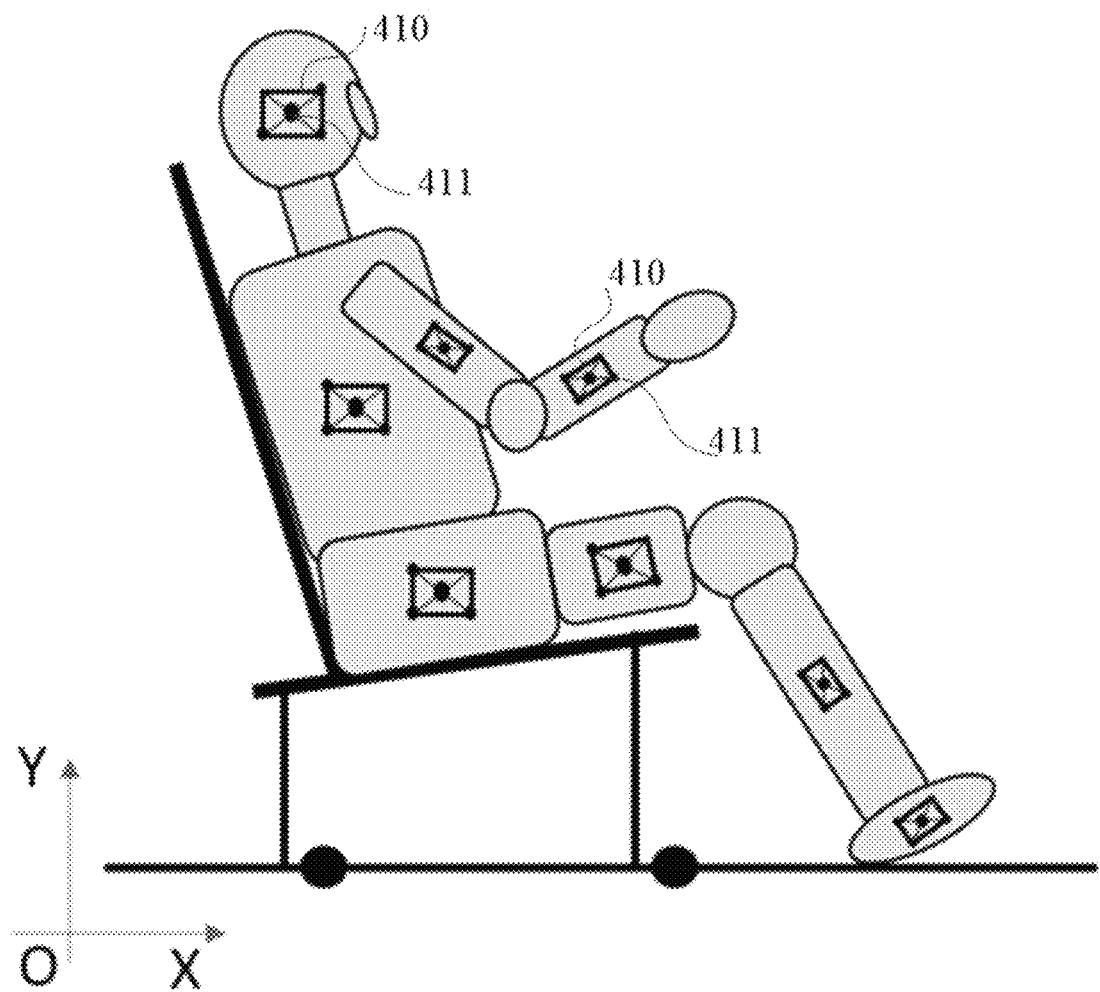
FIG. 4 is a schematic illustration of fixing a measurement mark on a part to be measured of the dummy according to an embodiment of the present invention.

Specifically, the measurement mark is a rectangular rigid plane, and the measurement mark is rigidly connected with the part to be measured of the dummy through the center point of the measurement mark, so as to ensure no relative displacement between the measurement mark and the part to be measured during the crash test, that is, to keep relatively static between the measurement mark and the part to be measured during the crash test. FIG. 4 shows a schematic illustration of fixing a measurement mark on the part to be measured of the dummy. The measurement mark 410 is rigidly connected with the part to be measured of the dummy through the center point 411 of the measurement mark 410, and the motion response of the part to be measured can be represented by the motion response of the center point 411.

Optionally, the measurement mark includes two measurement reference points. The two measurement reference points are set to determine the motion direction and displacement of a point in the measurement mark through the motion directions and displacements of the two measurement reference points, and then to determine the motion direction and displacement of the part to be measured, that is, the motion forms of translation and rotation of a point can be determined through the motion of the two measurement reference points. If the motion of a point is directly tracked, the motion form of rotation cannot be determined. In conclusion, the technical solution provided by the embodiment of the present invention can accurately determine the motion response of the part to be measured during the crash test.

Figure 5:
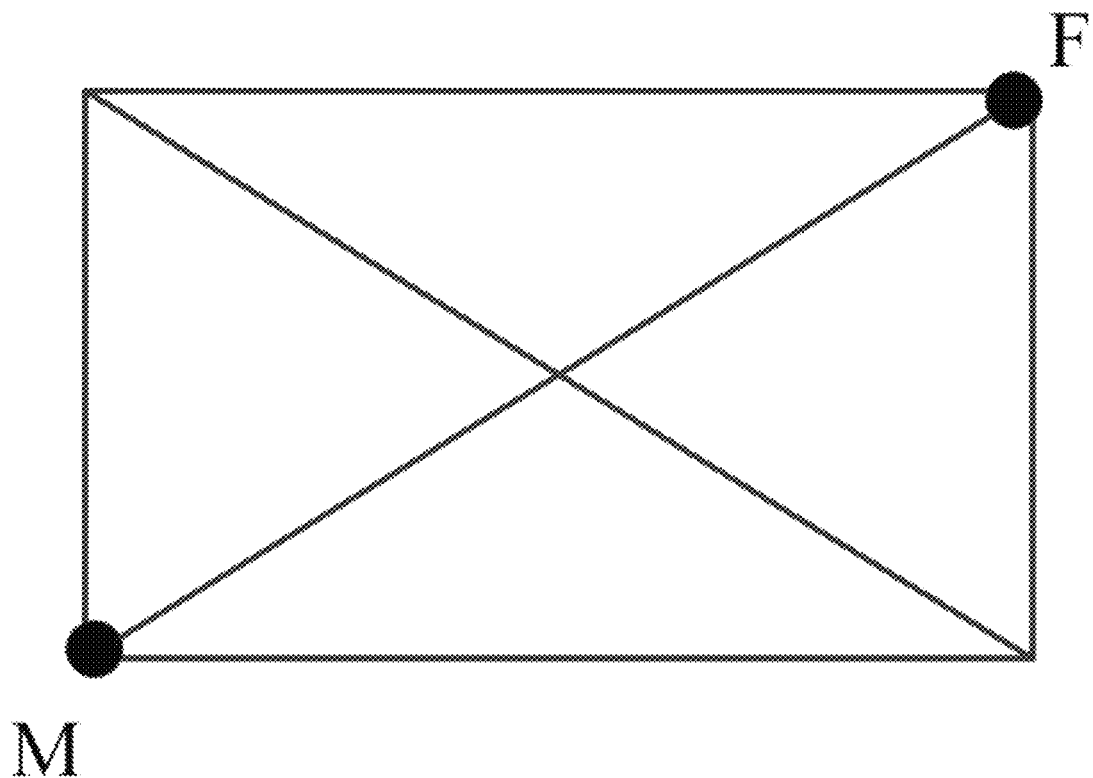
FIG. 5 is a schematic illustration of a measurement mark according to an embodiment of the present invention.

Preferably, as shown in FIG. 5, the two measurement reference points (M and F) are respectively two end points of a diagonal of a rectangular rigid plane. It can be understood that the two measurement reference points may also be other points on the rectangular rigid plane. Two end points of a diagonal are selected as the two measurement reference points to facilitate the calculation of the position of the center point of the measurement mark based on the positions of the two measurement reference points, so as to represent the motion response of the part to be measured through the motion response of the center point of the measurement mark.

Further, the size of the measurement mark is determined according to the part to be measured, and the sizes of the measurement marks corresponding to different parts to be measured are different, so as to further improve measurement accuracy.

Optionally, the preset conversion relationship is determined based on the coordinate positions of the reference points in the preset coordinate system and the coordinate positions of the reference points in the images. In order to facilitate measurement and indirectly ensure measurement accuracy, the reference points may be selected at positions closer to the camera. Exemplarily, as shown in FIG. 1 and FIG. 3, the measurement seat 1 is rigidly connected with the preset platform 2, reference points 8 and 9 are set at the intersecting line formed on the side close to the camera 3, and the coordinates of the two reference points 8 and 9 in the preset coordinate system are respectively 8 ($X_1$, $Y_1$) and 9 ($X_2$, $Y_2$). That is, the reference points are located on the intersecting line of the measurement seat and the preset platform close to the camera.

The second coordinate positions of the reference points 8 and 9 in the preset coordinate system, that is, the coordinates 8 ($X_1$, $Y_1$) and 9 ($X_2$, $Y_2$) may be obtained by pre-measurement. The first coordinate positions of the reference points 8 and 9 in any image captured by the camera may also be predetermined. Therefore, the conversion relationship between the preset coordinate system and the image coordinate system, that is, the preset conversion relationship, can be obtained based on the above data.

Exemplarily, the preset conversion relationship includes:

$$P_{\alpha i} = \left(\frac{X_i - X_1}{X_2 - X_1}\right)(P_{\alpha 2} - P_{\alpha 1}) + P_{\alpha 1}$$

$$P_{\beta i} = \left(\frac{Y_i - Y_1}{Y_2 - Y_1}\right)(P_{\beta 2} - P_{\beta 1}) + P_{\beta 1}$$

Herein, $P_{\alpha i}$ represents a horizontal axis component corresponding to the first coordinate position of a target measurement reference point in the measurement mark at time i during the crash test, $P_{\beta i}$ represents a vertical axis component corresponding to the first coordinate position of the target measurement reference point at time i during the crash test, $X_i$ represents an X-axis component corresponding to the second coordinate position of the target measurement reference point at time i during the crash test, $Y_i$ represents a Y-axis component corresponding to the second coordinate position of the target measurement reference point at time i during the crash test, $P_{\alpha 1}$ represents a horizontal axis component corresponding to the first coordinate position of a first reference point at any time, $P_{\beta 1}$ represents a vertical axis component corresponding to the first coordinate position of the first reference point at the corresponding time, $P_{\alpha 2}$ represents a horizontal axis component corresponding to the first coordinate position of a second reference point at any time, $P_{\beta 2}$ represents a vertical axis component corresponding to the first coordinate position of the second reference point at the corresponding time, $X_1$ represents an X-axis component corresponding to the second coordinate position of the first reference point at any time, $Y_1$ represents a Y-axis component corresponding to the second coordinate position of the first reference point at the corresponding time, $X_2$ represents an X-axis component corresponding to the second coordinate position of the second reference point at any time, and $Y_2$ represents a Y-axis component corresponding to the second coordinate position of the second reference point at the corresponding time.

In the above preset conversion relationship, $P_{\alpha 1}$, $P_{\beta 1}$, $P_{\alpha 2}$, $P_{\beta 2}$, $X_1$, $Y_1$, $X_2$, and $Y_2$ are all quantities obtained by pre-measurement. After the image is obtained at time i, $P_{\alpha i}$ and $P_{\beta i}$ are obtained based on the image. $X_i$ and $Y_i$ can be obtained by substituting $P_{\alpha i}$ and $P_{\beta i}$ into the formulas of the above preset conversion relationship.

Correspondingly, the determining first coordinate positions of the measurement mark in the images at different times, respectively includes:

determining first coordinate positions of the two measurement reference points in the images at different times, respectively.

The determining, according to the first coordinate positions, corresponding second coordinate positions of the measurement mark in a preset coordinate system at different times through a preset conversion relationship, includes:

determining, according to the first coordinate positions of the two measurement reference points in the images at different times, corresponding second coordinate positions of the two measurement reference points in the preset coordinate system at different times through the preset conversion relationship, respectively.

The determining the motion response of the part to be measured according to an initial position of the measurement mark in the preset coordinate system and the corresponding second coordinate positions of the measurement mark in the preset coordinate system at different times includes:

determining respective motion directions and motion trajectories of the two measurement reference points according to respective initial positions of the two measurement reference points in the preset coordinate system and the corresponding second coordinate positions of the two measurement reference points in the preset coordinate system at different times; and determining the motion response of the part to be measured according to the respective motion directions and motion trajectories of the two measurement reference points. The motion response of the dummy is a complex motion state composed of translation and rotation. Therefore, in order to accurately obtain the instantaneous motion direction and displacement of the part to be measured of the dummy during the crash, the motion direction and motion trajectory of the center point of the measurement mark are determined from the two measurement reference points of the measurement mark in the solution of the embodiment of the present invention. Specifically, an example is given to illustrate the process of determining the motion response of the part to be measured.

Figure 6:
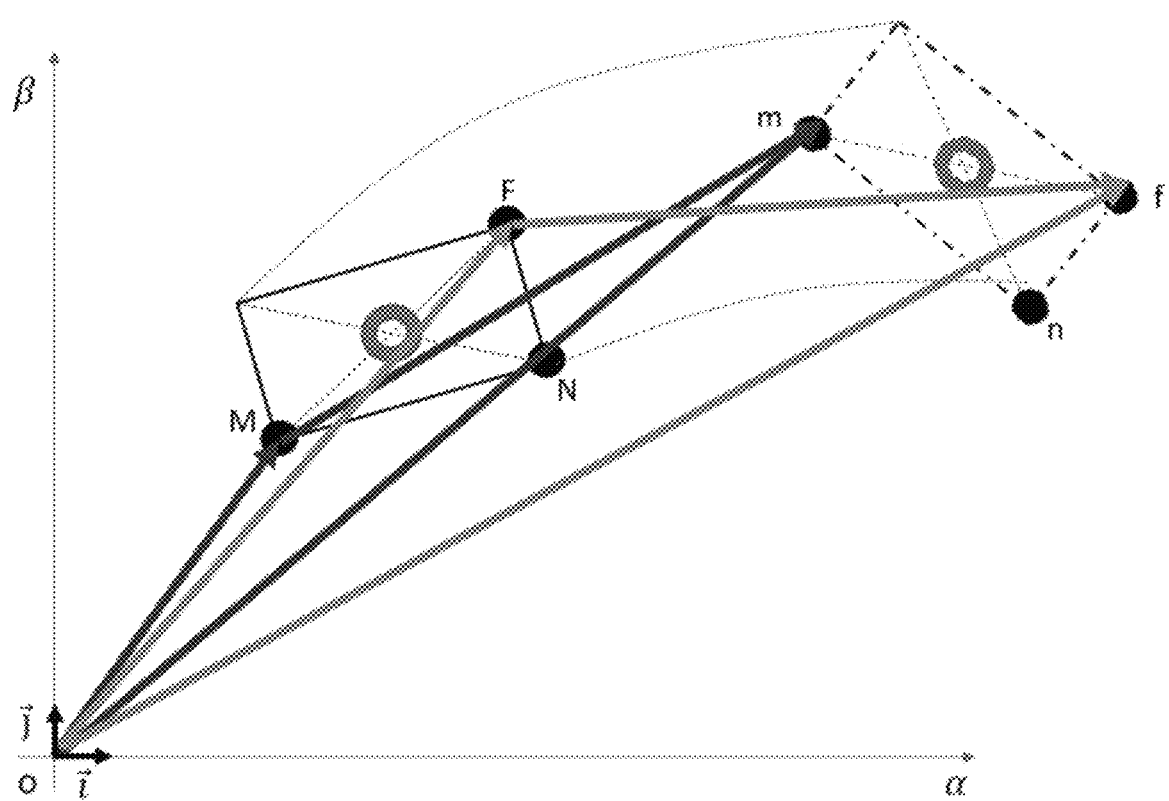
FIG. 6 is a schematic illustration of analysis on the principle of measuring the motion response of the measurement mark according to an embodiment of the present invention.

First, the side length of a pixel cell parallel to the horizontal axis of the preset coordinate system is defined as a unit vector $\vec{i}$ of a axis, and the side length of the pixel cell parallel to the vertical axis of the preset coordinate system is defined as a unit vector $\vec{j}$ of $\beta$ axis, wherein $\alpha o \beta$ is the coordinate system where the pixel cell in the image is located. By determining the motion responses of two end points of a diagonal of the measurement mark, the motion response of the measurement mark can be obtained, and then the motion response of the part to be measured of the crash dummy can be obtained. FIG. 6 shows a schematic illustration of a motion response of the measurement mark. The measurement reference points at two ends of a diagonal of the measurement mark are respectively M and F. The positions of M and F in the initial image before the start of the measurement crash test are recorded, and vectors $\overrightarrow{OM}$ and $\overrightarrow{OF}$ are respectively obtained. Herein, $\overrightarrow{OM}=(P_{\alpha M}, P_{\beta M})$ and $\overrightarrow{OF}=(P_{\alpha F}, P_{\beta F})$.

After the motion response of the dummy occurs, the measurement reference points M and F move relative to their initial positions in the next frame of image. Assuming that the measurement reference points M and F correspond to measurement reference points m and f in the next frame of image, vectors $\overrightarrow{Om}$ and $\overrightarrow{Of}$ can be respectively obtained, wherein $\overrightarrow{Om}=(P_{\alpha m}, P_{\beta m})$, $\overrightarrow{Of}=(P_{\alpha f}, P_{\beta f})$.

In the coordinate system $\alpha o \beta$, the displacement vectors of the measurement reference points M and F of the measured part of the dummy moving to the points m and f respectively are $\overrightarrow{Mm}$ and $\overrightarrow{Ff}$, which can be expressed as follows:

$$\overrightarrow{Mm}=\overrightarrow{Om}-\overrightarrow{OM}$$

$$\overrightarrow{Ff}=\overrightarrow{Of}-\overrightarrow{OF}$$

The displacements of the measurement reference points M and F in the coordinate system $\alpha o \beta$ can be expressed as follows with the unit vector $\vec{i}$ of the $\alpha$ axis and the unit vector $\vec{j}$ of the $\beta$ axis.

$$\overrightarrow{Mm}=(P_{\alpha m}-P_{\alpha M})\vec{i}+(P_{\beta m}-P_{\beta M})\vec{j}$$

$$\overrightarrow{Ff}=(P_{\alpha f}-P_{\alpha F})\vec{i}+(P_{\beta f}-P_{\beta F})\vec{j}$$

By measuring the pixel cell coordinates ($P_{\alpha i} \cdot P_{\beta i}$) of the image, captured by the camera, of the center point of the measurement mark at any time $T_i$, and the corresponding relationship between the coordinate system $\alpha o \beta$ where the image is located and the coordinate system XOY of actual motion trajectory test scenario of the dummy, the position of the part to be measured of the dummy in the coordinate system XOY of actual test scenario at any time can be obtained as follows.

$$\overrightarrow{Mm_i} = \left( \left( \left( \frac{P_{\alpha mi} - P_{\alpha m1}}{P_{\alpha m2} - P_{\alpha m1}} \right)(X_{m2} - X_{m1}) + X_{m1} \right) - P_{\alpha M} \right)\vec{i} +$$

$$\left( \left( \left( \frac{P_{\beta mi} - P_{\beta m1}}{P_{\beta m2} - P_{\beta m1}} \right)(Y_{m2} - Y_{m1}) + Y_{m1} \right) - P_{\beta M} \right)\vec{j}$$

$$\overrightarrow{Ff_i} = \left( \left( \left( \frac{P_{\alpha fi} - P_{\alpha f1}}{P_{\alpha f2} - P_{\alpha f1}} \right)(X_{f2} - X_{f1}) + X_{f1} \right) - P_{\alpha F} \right)\vec{i} +$$

$$\left( \left( \left( \frac{P_{\beta fi} - P_{\beta f1}}{P_{\beta f2} - P_{\beta f1}} \right)(Y_{f2} - Y_{f1}) + Y_{f1} \right) - P_{\beta F} \right)\vec{j}$$

Figure 7:
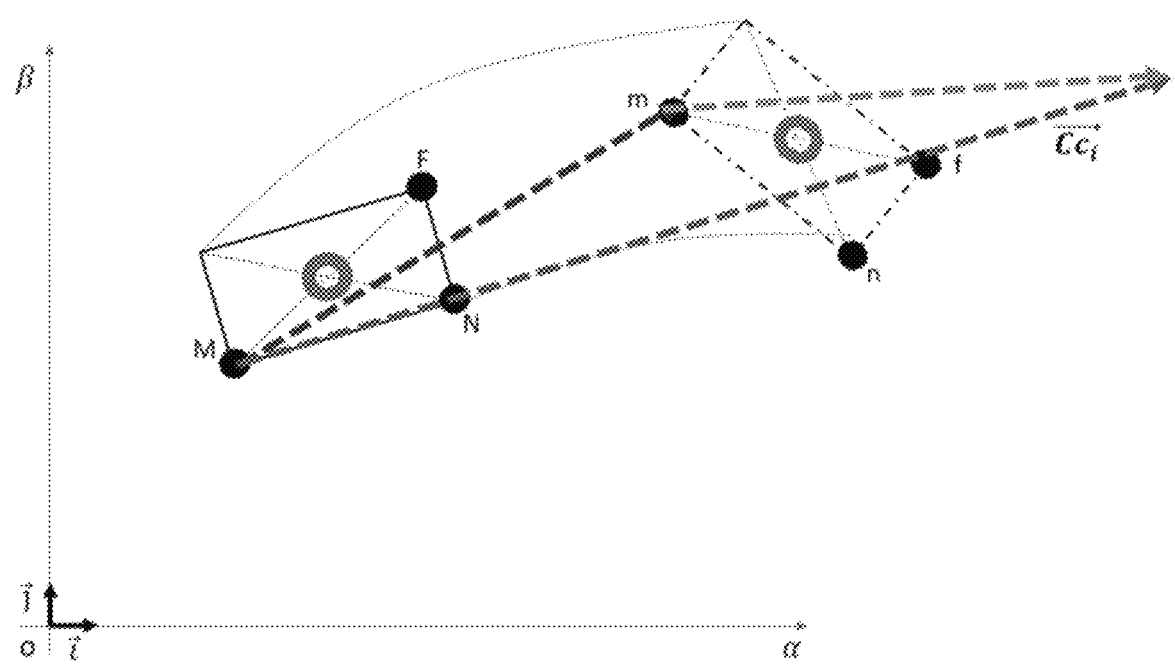
FIG. 7 is another schematic illustration of analysis on the principle of measuring the motion response of the measurement mark according to an embodiment of the present invention.

Further, the two measurement reference points are regarded as motion components of the measurement mark, then the motion response of the measurement mark at any time is the direction of a composite vector $\overrightarrow{Cc_i}$, that is, the motion direction of the measured part where the measurement mark is located, as shown in FIG. 7. Specifically, the composite vector can be expressed as $\overrightarrow{Cc_i} = \overrightarrow{Mm_i} + \overrightarrow{Ff_i}$.

The motion trajectory of the measured part of the dummy is represented by the motion displacement trajectory of the center point G ($X_{gi} \cdot Y_{gi}$) of the measurement mark at any time $T_i$, which can be specifically expressed as follows.

$$G(X_{gi} \cdot Y_{gi}) = \left( \frac{\left( \left( \frac{P_{\alpha mi} - P_{\alpha m1}}{P_{\alpha m2} - P_{\alpha m1}} \right)(X_{m2} - X_{m1}) + X_{m1} \right)}{2} + \right.$$

$$\frac{\left( \left( \frac{P_{\alpha fi} - P_{\alpha f1}}{P_{\alpha f2} - P_{\alpha f1}} \right)(X_{f2} - X_{f1}) + X_{f1} \right)}{2} ,$$

$$\left. \frac{\left( \left( \frac{P_{\beta mi} - P_{\beta m1}}{P_{\beta m2} - P_{\beta m1}} \right)(Y_{m2} - Y_{m1}) + Y_{m1} \right)}{2} + \frac{\left( \left( \frac{P_{\alpha fi} - P_{\alpha f1}}{P_{\alpha f2} - P_{\alpha f1}} \right)(X_{f2} - X_{f1}) + X_{f1} \right)}{2} \right)$$

The center points G ($X_{gi} \cdot Y_{gi}$) of the measurement mark are connected in time sequence to obtain the motion response of the part to be measured of the dummy.

This embodiment has the following technical effects: aiming at the problem that the motion response displacement trajectory of any part of the dummy cannot be directly and accurately measured, the embodiment of the present invention provides a method for measuring a motion response trajectory of a dummy for crash test, which overcomes the problem that the motion trajectory of any part cannot be measured because the conventional measurement method requires angular velocity sensors and acceleration sensors but most parts of the dummy cannot be installed with the two types of sensors. A real, effective and accurate motion trajectory measurement method is provided for biological simulation evaluation of a crash dummy and safety performance test of a vehicle.

On the basis of the above embodiment, an embodiment will be described by measuring a motion response trajectory of Hybrid 11150th dummy's head.

Figure 8:
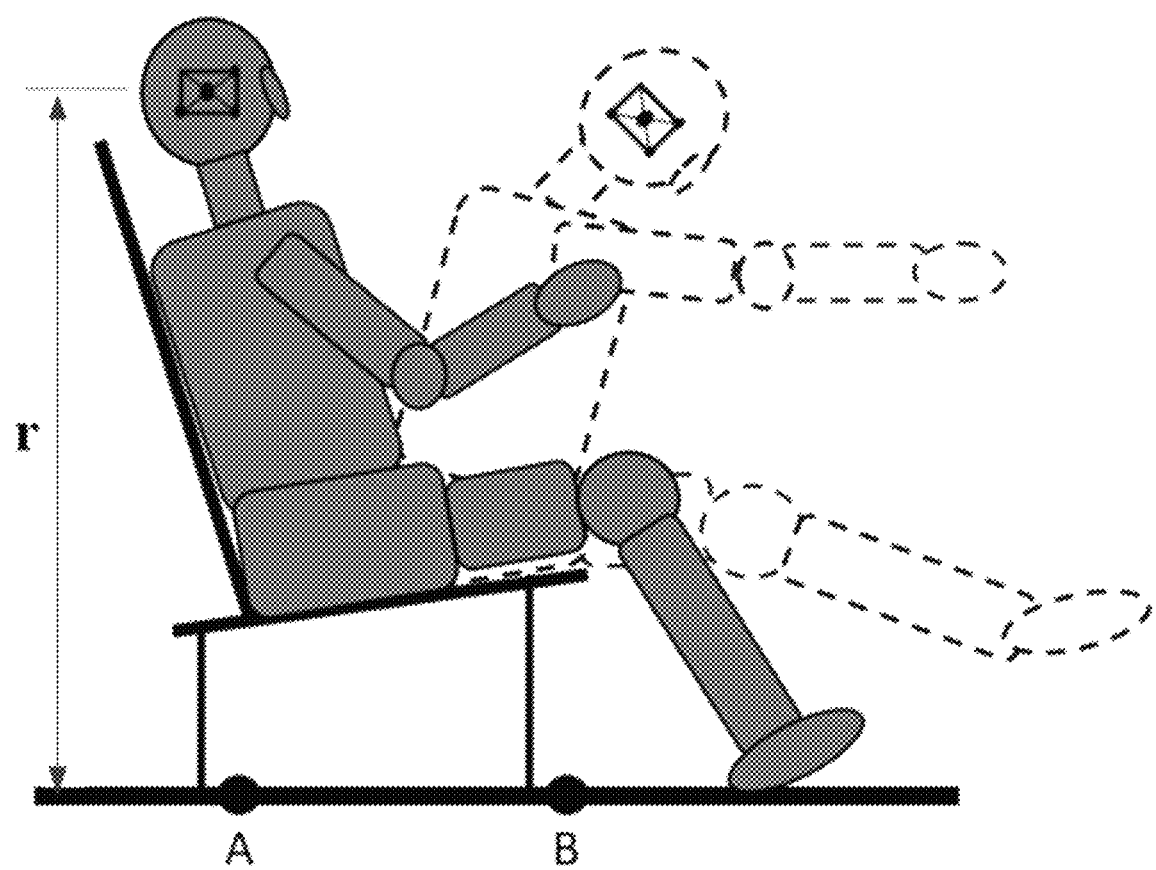
FIG. 8 is a schematic illustration of a measurement mark crashing the head of the dummy according to an embodiment of the present invention.

The measurement mark is rigidly fixed to the center of mass of the dummy's head, the vertical distance between the fixed connection point (center of mass) of the dummy and the X-axis is r, and r=944 mm, as shown in FIG. 8.

The measurement seat is rigidly fixed on the track traction platform, and the high-speed camera is perpendicular to the plane where the motion direction of the track traction platform is located. The resolution of the high-speed camera is 1280*1024, and the number of frames captured per second is 1,000, so the time corresponding to each frame is 1 ms.

A preset coordinate system XOY is defined, and its X-axis is parallel to the motion direction of the track traction platform and is located in the plane of the upper surface of the track traction platform. Its Y-axis is perpendicular to the motion direction of the track traction platform, and the intersecting point of the X-axis and the Y-axis on the upper surface of the track traction platform is origin O of the XOY coordinate system. The central axis of the high-speed camera is perpendicular to the XY plane. The horizontal position of the high-speed camera is adjusted, so that a first side of pixel cells of each frame of image captured by the high-speed camera is parallel to the X-axis, and a second side intersecting the first side is parallel to the Y-axis.

Two reference points are set at the intersecting line formed by the rigid connection between the measurement seat and the track traction platform on the side close to the high-speed camera, the coordinates of the two reference points are respectively ($X_1$, $Y_1$) and ($X_2$, $Y_2$). $X_2-X_1$=1 m, and $Y_2-Y_1$=1 m. The vertical distance between the center point of the lens of the high-speed camera and the line connecting the two reference points is adjusted, so that the dummy is located within the shooting angle range of the high-speed camera during the entire measurement process. The distance between the center point of the lens of the high-speed camera and the imaging surface is related to the structure of the high-speed camera itself. The coordinate of the pixel cell of the specific measurement point on the image captured by the high-speed camera at any time Ti in the coordinate system $\alpha o \beta$ are ($P_{\alpha i} \cdot P_{\beta i}$), and the relationship (i.e., the preset conversion relationship) corresponding to the coordinate ($X_i \cdot Y_i$) of the specific measurement point actually in the XOY coordinate system is:

$$P_{\alpha i} = \left( \frac{X_i - X_1}{1000} \right)(P_{\alpha 2} - P_{\alpha 1}) + P_{\alpha 1}$$

$$P_{\beta i} = \left( \frac{Y_i - Y_1}{1000} \right)(P_{\beta 2} - P_{\beta 1}) + P_{\beta 1}$$

Figure 9:
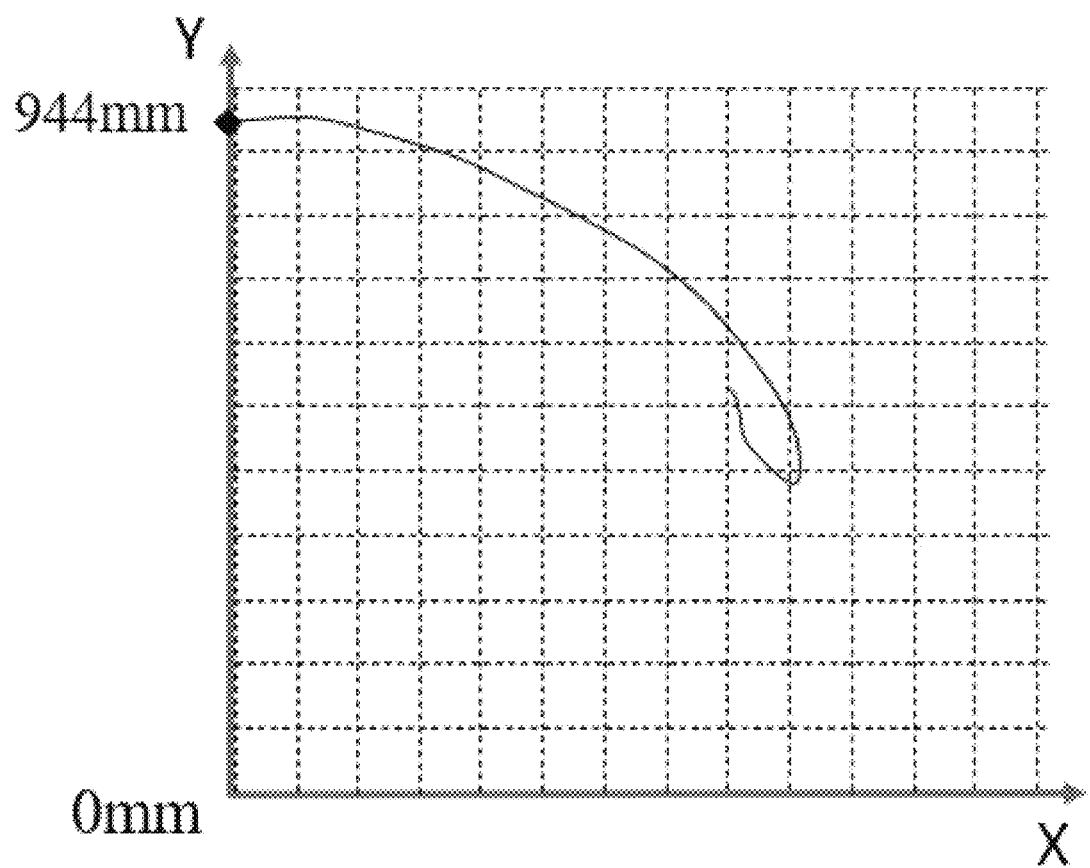
FIG. 9 is a schematic illustration of a motion displacement trajectory of the head of the dummy in an XY plane according to an embodiment of the present invention.

The motion response trajectory of the dummy's head can be obtained by continuing the calculation according to the above embodiment, as shown in FIG. 9.

Figure 10:
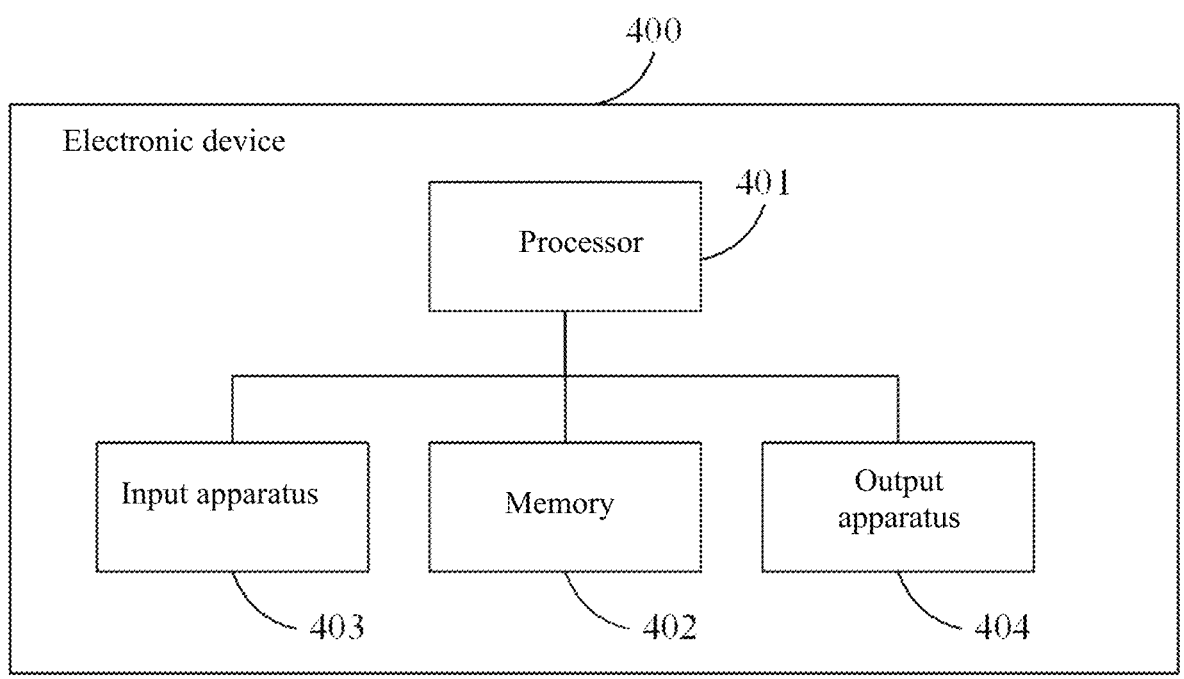
FIG. 10 is a schematic structural illustration of an electronic device according to an embodiment of the present invention.

FIG. 10 is a schematic structural illustration of an electronic device according to an embodiment of the present invention. As shown in FIG. 10, the electronic device 400 includes one or more processors 401 and a memory 402.

The processor 401 may be a central processing unit (CPU) or other forms of processing unit having data processing capability and/or instruction execution capability, and may control other components in the electronic device 400 to execute desired functions.

The memory 402 may include one or more computer program products which may include various forms of computer-readable storage media, such as a volatile memory and/or a non-volatile memory. The volatile memory may include, for example, a random access memory (RAM) and/or a cache memory (cache). The non-volatile memory may include, for example, a read-only memory (ROM), a hard disk, a flash memory, etc. One or more computer program instructions may be stored in the computer-readable storage medium, and the processor 401 may run the program instructions to implement the method for measuring the motion response of a dummy in a crash test according to any embodiment of the present invention described above and/or other desired functions. Various contents such as initial extrinsic parameters and thresholds may also be stored in the computer-readable storage medium.

In one example, the electronic device 400 may further include an input apparatus 403 and an output apparatus 404, and these components are interconnected by a bus system and/or other forms of connection mechanism (not shown). The input apparatus 403 may include, for example, a keyboard, a mouse, etc. The output apparatus 404 may output a variety of information to the outside, including early warning information, braking force, etc. The output apparatus 404 may include, for example, a display, a speaker, a printer, a communication network and its connected remote output device, etc.

Of course, for simplicity, only some of the components in the electronic device 400 related to the present invention are shown in FIG. 10, and components such as buses and input/output interfaces are omitted. Besides, the electronic device 400 may further include any other appropriate components according to the specific application.

In addition to the method and device described above, the embodiment of the present invention may also be computer program products including computer program instructions that, when run by a processor, cause the processor to execute the steps of the method for measuring the motion response of a dummy in a crash test according to any embodiment of the present invention.

The computer program product may be written in one of programming languages or any combination thereof to execute program codes operated in the embodiments of the present invention. The programming languages include object-oriented programming languages, such as Java and C++, and also include conventional procedural programming languages, such as "C" language or similar programming languages. The program codes may be completely executed on a user's computing device, partially executed on a user's device, executed as a separate software package, partially executed on a user's computing device and partially executed on a remote computing device, or completely executed on a remote computing device or server.

In addition, the embodiment of the present invention may also be a computer-readable storage medium storing computer program instructions that, when run by a processor, cause the processor to execute the steps of the method for measuring the motion response of a dummy in a crash test according to any embodiment of the present invention.

The computer-readable storage medium may employ one of readable media or any combination thereof. The readable media may be readable signal media or readable storage media. The readable storage media may include, for example, but are not limited to, electrical, magnetic, optical, electromagnetic, infrared, or semiconductor systems, apparatuses or devices, or any combination of the above. More specific examples (non-exhaustive list) of the readable storage media include: an electrical connection with one or more wires, a portable disk, a hard disk, a random access memory (RAM), a read-only memory (ROM), an erasable programmable read-only memory (EPROM or flash memory), a fiber, a portable compact disk read-only memory (CD-ROM), an optical memory, a magnetic memory, or any suitable combination of the above.

It should be noted that the terms used in the present invention are only used to describe specific embodiments, rather than limiting the scope of the present application. As shown in the description and claims of the present invention, unless the context clearly dictates otherwise, the words "a", "an", "an" and/or "the" are not intended to specifically refer to the singular and may include the plural. The terms "include", "comprise", or any variants thereof are intended to cover a non-exclusive inclusion, so that a process, method or device that includes a series of elements not only includes those elements, but also includes other elements not listed explicitly, or includes inherent elements of the process, method or device. In the absence of more limitations, an element defined by "include a . . . " does not exclude other same elements existing in the process, method or device including the element.

It should also be noted that the orientation or position relations indicated by the terms "center", "upper", "lower", "left", "right", "vertical" "horizontal", "inner", "outer", etc. are based on the orientation or position relations shown in the accompanying drawings and are intended to facilitate the description of the present invention and simplify the description only, rather than indicating or implying that the device or element referred to must have a particular orientation or be constructed and operated in a particular orientation, and will not to be interpreted as limiting the present invention. Unless otherwise expressly specified and limited, the terms "installed", "coupled" and "connected" should be generally understood, for example, the "connected" may be fixedly connected, detachably connected, integrally connected, mechanically connected, electrically connected, directly connected, or connected by a medium, or communicated for the interiors of two elements. For those of ordinary skill in the art, the specific meanings of the terms descried above in the present invention should be construed according to specific circumstances.

Finally, it should be noted that the above embodiments are only for explaining, but not limiting, the technical solutions of the present invention; Although the present invention is described in detail with reference to the foregoing embodiments, those of ordinary skill in the art should understood that the technical solutions described in the foregoing embodiments may be modified, or some or all of the technical features may be equivalently substituted; and such modifications or substitutions do not make the essence of the corresponding technical solutions depart from the technical solutions of the embodiments of the present invention.

What is claimed is:

1. A method for measuring a motion response of a dummy in a crash test, comprising:

acquiring images of a measurement mark at different times by a camera during the crash test, wherein the measurement mark is fixed on a part to be measured of the dummy, and the dummy is set in association with a preset platform;

determining first coordinate positions of the measurement mark in the images at different times, respectively;

determining, according to the first coordinate positions, corresponding second coordinate positions of the measurement mark in a preset coordinate system at different times through a preset conversion relationship, wherein an X-axis of the preset coordinate system is parallel to a motion direction of the preset platform, a Y-axis of the preset coordinate system is perpendicular to the motion direction of the preset platform, a first side of pixel cells of the images is parallel to the X-axis, a second side of the pixel cells intersecting with the first side is parallel to the Y-axis, and the preset conversion relationship is determined based on coordinate positions of reference points in the preset coordinate system and the coordinate positions of the reference points in the images; and determining the motion response of the part to be measured according to an initial position of the measurement mark in the preset coordinate system and the second coordinate positions.

2. The method according to claim 1, wherein the measurement mark comprises two measurement reference points;

correspondingly, the determining first coordinate positions of the measurement mark in the images at different times, respectively comprises:

determining first coordinate positions of the two measurement reference points in the images at different times, respectively;

the determining, according to the first coordinate positions, corresponding second coordinate positions of the measurement mark in a preset coordinate system at different times through a preset conversion relationship, comprises:

determining, according to the first coordinate positions of the two measurement reference points in the images at different times, corresponding second coordinate positions of the two measurement reference points in the preset coordinate system at different times through the preset conversion relationship, respectively.

3. The method according to claim 2, wherein the measurement mark is a rectangular rigid plane, and the measurement mark is rigidly connected with the part to be measured of the dummy through a center point of the measurement mark;

the two measurement reference points are respectively two end points of a diagonal of the rectangular rigid plane; and a size of the measurement mark is determined according to the part to be measured, and sizes of the measurement marks corresponding to different parts to be measured are different.

4. The method according to claim 2, wherein the determining the motion response of the part to be measured according to an initial position of the measurement mark in the preset coordinate system and the corresponding second coordinate positions of the measurement mark in the preset coordinate system at different times comprises:

determining respective motion directions and motion trajectories of the two measurement reference points according to respective initial positions of the two measurement reference points in the preset coordinate system and the corresponding second coordinate positions of the two measurement reference points in the preset coordinate system at different times; and determining the motion response of the part to be measured according to the respective motion directions and motion trajectories of the two measurement reference points.

5. The method according to claim 1, wherein the preset platform is a track traction platform, and the preset platform slides along a preset track during the crash test; and a measurement seat is arranged on the preset platform, the measurement seat is rigidly fixed on the preset platform, and the dummy is arranged on the measurement seat.

6. The method according to claim 5, wherein the reference points are located on the intersecting line of the measurement seat and the preset platform close to the camera.

7. The method according to claim 1, wherein the preset conversion relationship comprises:

$$P_{\alpha i} = \left(\frac{X_i - X_1}{X_2 - X_1}\right)(P_{\alpha 2} - P_{\alpha 1}) + P_{\alpha 1}$$

$$P_{\beta i} = \left(\frac{Y_i - Y_1}{Y_2 - Y_1}\right)(P_{\beta 2} - P_{\beta 1}) + P_{\beta 1}$$

where $P_{\alpha i}$ represents a horizontal axis component corresponding to the first coordinate position of a target measurement reference point in the measurement mark at time i during the crash test, $P_{\beta i}$ represents a vertical axis component corresponding to the first coordinate position of the target measurement reference point at time i during the crash test, $X_i$ represents an X-axis component corresponding to the second coordinate position of the target measurement reference point at time i during the crash test, $Y_i$ represents a Y-axis component corresponding to the second coordinate position of the target measurement reference point at time i during the crash test, $P_{\alpha 1}$ represents a horizontal axis component corresponding to the first coordinate position of a first reference point at any time, $P_{\beta 1}$ represents a vertical axis component corresponding to the first coordinate position of the first reference point at the corresponding time, $P_{\alpha 2}$ represents a horizontal axis component corresponding to the first coordinate position of a second reference point at any time, $P_{\beta 2}$ represents a vertical axis component corresponding to the first coordinate position of the second reference point at the corresponding time, $X_1$ represents an X-axis component corresponding to the second coordinate position of the first reference point at any time, $Y_1$ represents a Y-axis component corresponding to the second coordinate position of the first reference point at the corresponding time, $X_2$ represents an X-axis component corresponding to the second coordinate position of the second reference point at any time, and $Y_2$ represents a Y-axis component corresponding to the second coordinate position of the second reference point at the corresponding time.

8. An electronic device, comprising:
a processor and a memory, wherein
the processor is configured to execute the steps of the method for measuring the motion response of a dummy in a crash test according to claim 1 by calling programs or instructions stored in the memory.

9. A non-transitory computer-readable storage medium, wherein the non-transitory computer-readable storage medium stores programs or instructions that cause a computer to execute the steps of the method for measuring the motion response of a dummy in a crash test according to claim 1.

* * * * *